United States Patent
Leskosek

(10) Patent No.: US 9,316,726 B2
(45) Date of Patent: Apr. 19, 2016

(54) QUANTUM HARMONIC RADAR

(71) Applicant: James Andrew Leskosek, Summerland (CA)

(72) Inventor: James Andrew Leskosek, Summerland (CA)

( * ) Notice: Subject to any disclaimer, the term of this patent is extended or adjusted under 35 U.S.C. 154(b) by 610 days.

(21) Appl. No.: 13/720,674

(22) Filed: Dec. 19, 2012

(65) Prior Publication Data

US 2015/0029052 A1   Jan. 29, 2015

(51) Int. Cl.
*G01S 13/04* (2006.01)
*G01S 13/02* (2006.01)

(52) U.S. Cl.
CPC ........... *G01S 13/04* (2013.01); *G01S 2013/029* (2013.01)

(58) Field of Classification Search
CPC .................... G01S 13/04; G01S 2013/029
USPC .......................................................... 342/27
See application file for complete search history.

(56) References Cited

U.S. PATENT DOCUMENTS

| | | | |
|---|---|---|---|
| 3,127,608 A | 3/1964 | Eldredge | |
| 5,036,323 A | 7/1991 | Cain et al. | |
| 5,808,577 A | 9/1998 | Brinsfield | |
| 7,212,147 B2 | 5/2007 | Messano | |
| 7,460,056 B2 | 12/2008 | Rivas et al. | |
| 7,952,511 B1 * | 5/2011 | Geer | G01S 7/292 342/13 |
| 8,570,210 B1 * | 10/2013 | Fonder et al. | 342/25 B |
| 2011/0205522 A1 * | 8/2011 | Snow et al. | 356/5.01 |
| 2012/0268305 A1 | 10/2012 | Macsisak | |
| 2013/0116561 A1 * | 5/2013 | Rothberg et al. | 600/438 |

* cited by examiner

*Primary Examiner* — Timothy A Brainard
(74) *Attorney, Agent, or Firm* — Antony C. Edwards

(57) ABSTRACT

A quantum harmonic radar method includes comparing the determined timing or spacing of the detected hertzian waves with the pre-determined amplitude and frequency of the hertzian waves being transmitted from a transmitter, and by the comparison determining if the detected hertzian waves have a spacing therebetween is greater than a spacing between said transmitted hertzian waves having said pre-determined amplitude and frequency, whereupon signalling a presence in said transmission field of an electromagnetic energy absorbent object.

12 Claims, 4 Drawing Sheets

QUANTUM HARMONIC RADAR

FIELD OF THE INVENTION

The invention relates to the field of detecting objects by radar and in particular to a quantum harmonic radar wherein energy absorbing objects are detected by the detectable affect of such absorption on radiation transmitted to the object.

BACKGROUND OF THE INVENTION

The electro-magnetic environment surrounding us, and in particular, surrounding a radar installation may be thought of as a continuum in which events acting on the continuum are not localized or found in isolation but, rather, are felt, and act on, the entire continuum, subject to naturally occurring attenuation. Further, it is not only events which cause what are described as ripples or waves which affect the continuum, but also the converse of such events, wherein a hole or void also affects the continuum. It is with respect to the latter that the present specification is directed.

As well documented in the prior art, such as described by Brinsfield in U.S. Pat. No. 5,808,577 which issued Sep. 15, 1998 for a Stealth Aircraft Identification System, stealth aircraft, that is, which are normally not detected by airborne, ground or sea based radar systems, have external contours that redirect return signals in non-threat directions so that little of the incident radar signal is detected, and which aircraft are partially or completely coated with radar absorbing materials that are fabricated using internal structures that also absorb the incident radar signal. Typical radar absorbent material include iron particles dispersed in a resin matrix material, either as a paint or structural material such as composite skin.

Messano in his U.S. Pat. No. 7,212,147 which issued May 1, 2007 for a Method of Agile Reduction of Radar Cross Section using Electromagnetic Channelization describes that stealth technologies rely on five elements to minimize the size of the radar cross section of a target: namely, radar absorbent material, internal radar absorbent construction, external low absorbable geometry, infrared emissions control, and specialized mission profiles. Messano describes the radar absorbent material approach incorporates the use of coatings containing iron ferrite material which transform the electric component of the incoming radar wave into a magnetic field so that consequently the energy of the incoming radar wave is allowed to dissipate.

Applicant is also aware of published U.S. Patent Application, Publication No. 2012/0268305, in the application of Macsisak, published. Oct. 25, 2012 and entiltled Stealth. Detector. Macsisak describes a stealth detector having three radars which are aimed at slightly different angles so that the corresponding three radar signals will each send a radar signal back to a radar installation where a computer or analyst determines if the three radar signals show the detected object to be a stealth plane.

Geer in his U.S. Pat. No. 7,952,511 which issued May 31, 2011 for a Method and Apparatus for the Detection of Objects using Electro Magnetic Wave Attenuation Patterns describe that the primary method for making an object stealthy is to reduce its radar cross section, and at one way this is achieved is that surfaces are coated with materials that absorb microwave radiation, and honeycomb sections are formed which trap microwaves, preventing reflections. Geer describes that because other countries have developed stealth technology, that it is becoming increasingly important for any military to be able to detect stealth craft. Geer proposes to detect both stealth and non-stealth craft, not by the echo of an electromagnetic wave reflecting off an object such as in conventional radar, but rather to detect an attenuation of an electro-magnetic wave pattern due to obstruction of beam propagation by the object. Geer states that, therefore, design principles of stealth craft which seek to absorb microwave radiation will increase contrast, making them "visible". Geer continues stating that, while beam interruption sensors are well known and used in security systems and industrially, that his system includes a number of distinctions, for example, that he does not seek to provide a narrow beam that is fully blocked by the object to be detected. Rather, Geer proposes using a beam which illuminates a much larger area than the cross section of the craft to therefore provide a region of detection significantly larger than a "line of sight" so that a large volume of space is monitored by a detector node, similar to traditional radar installations and in contrast to known shadow detectors. Geer describes his negative radar as detecting an alteration in a background radiation pattern resulting from an object interfering with transmission thereof. Geer states that the phrase negative radar refers to the effect wherein the silhouette of any craft, including a stealth craft, will block transmission of a radar beam, resulting in detectability of the attenuation of the microwave radiation.

Thus, so called stealth technology as for example applied to an aircraft, includes various aspects and different technologies working together as a system and which includes absorbing the energy of a wave propagated by conventional radar. By absorbing the incoming waves a stealth object minimizes the reflection of the incoming waves from the radar. The reflected waves which are reflected off the stealth object and sensed by the radar receiver are mis-interpreted by the radar as belonging to other than the stealth object, for example an object having a much smaller cross section. In the best case, the radar waves are not reflected at all and thus the stealth object completely avoids detection.

As would be known to one skilled in the art, other forms of stealth technology exist, such as for example so-called plasma stealth which uses a layer or cloud of ionized gas or plasma around a craft to reduce radar cross section, or other active stealth measures, or other passive stealth measures such as stealth coverings containing carbon nanotubes.

SUMMARY OF THE INVENTION

The present invention is a system and method which detects an object, for example a stealth object by the effect the absorption of the radar waves by the stealth object has on the radar waves being emitted by the radar transmitter. This effect is as if the electro—magnetic environment extending between the radar transmitter and the stealth object were a rubber sheet and the absorption of the radar waves by the stealth object "pulls" on the sheet, thereby stretching it slightly. In this analogy the stretching of the sheet causes the wavelength of the radar waves which are propogating in the direction of the stealth object to lengthen slightly but detectably. A series of sensors measuring the wave length and corresponding frequency of the radar waves may then directionally locate the stealth object.

Preferably the sensors are located at or near the transmitter, and may be one or more sensor arrays, for example linear or matrix arrays, of sensors. For example, and advantageously, the sensor arrays may be positioned forward of a transmitter "dish" or antenna of the radar transmitter. In one embodiment they may be a pair of parallel arrays of sensors.

Put another way, the electro-magnetic web includes the amplitude and frequency characterising electro-magnetic waves and the reactions the waves have with the environment they are passing through. As a result of this reaction, the electro-magnetic waves become part of the sensor itself, much like an electromagnetic probe. By knowing the dynamics of the waves the variations of different elements in the environment and the distances may be calculated. By sending the electro-magnetic waves through the environment, the sensor uses the effects of each wave as it reacts to subsequent waves. For every reaction, there is an equal opposite reaction.

The wave-length amplitude and/or frequency characteristics which are detected as disturbances to the electro-magnetic environment may differ according to, for example, the type of stealth technology being used or stealth materials being employed. It is intended to be within the scope of this invention to create a database of known characteristics which are correlated to known stealth technologies or materials so that a detected stealth object may be identified according to its unique detected wave-length amplitude and/or frequency characteristics.

In summary, the quantum harmonic radar method according to one aspect of the present invention may be characterized as including:

a) providing a transmitter for transmitting electromagnetic hertzian waves across a transmission field, b) providing a plurality of electromagnetic sensors in a sensor array positioned in the transmission field and spaced from the transmitter, wherein each sensor of the plurality of electromagnetic sensors is adapted to detect characteristics of the hertzian waves.

c) providing a processor cooperating with the sensor array, wherein the processor is adapted to determine at least wave timing or wave spacing of the hertzian waves which are detected by the sensor array based on the detected characteristics, d) transmitting the hertzian waves having a predetermined amplitude and frequency from the transmitter across said transmission field and across the sensor array, e) detecting the characteristics of the hertzian waves by the sensor array and determining the timing or the spacing of the hertzian waves in the processor, f) comparing the determined timing or spacing of the detected hertzian waves with the pre-determined amplitude and frequency of the hertzian waves being transmitted from the transmitter, and by the comparison determining if the detected hertzian waves have a spacing therebetween which is greater than a spacing between the transmitted hertzian waves having the pre-determined amplitude and frequency, whereupon signalling a presence in the transmission field of an electromagnetic energy absorbent object.

The sensor array may include at least two spaced apart sensor probes and wherein the determining of the timing or spacing of the hertzian waves further includes triangulation of a position of the energy absorbent object by a comparison of the timing or spacing as detected by, and determined from, said hertzian waves detected by the at least two spaced apart sensor probes.

The transmission of the hertzian waves from the transmitter is in a first direction. Each probe of the at least two spaced apart sensor probes is elongate and contains a plurality of electromagnetic sensors therealong, wherein advantageously the probes are elongate in a direction substantially in the first direction. The sensor arrays may also be on grids, advantageously high definition grids. The grids may be stacked one on another. For example, the at least two spaced apart sensors probes are a substantially parallel pair of elongate sensor probes, wherein each sensor probe may include at least two sensors mounted therealong. Each sensor may detect the hertzian waves by charging, and clocks the waves by a charging time of each charging of the sensors.

In one embodiment the processor receives clocking information from the sensor and determines shape, timing or spacing information of the detected hertzian waves for each sensor. The processor may determine differences between the information for each sensor so as to postulate existence of, and identify by use of a look-up or other database, a detected energy absorbing object in the transmission field. Advantageously the processor determines attributes of the energy absorbing object from the group of attributes comprising: distance, direction, velocity, resistance.

BRIEF DESCRIPTION OF THE DRAWINGS

In the drawings wherein similar reference characters denote corresponding parts in each view.

DETAILED DESCRIPTION OF EMBODIMENTS OF THE INVENTION

Electromagnetic sensors 8 are positioned in web 10 of hertzian waves 12. Waves 12 are created, so as to eminate in direction A from transmitter 14, by transmitting waves 12 at a pre-determined frequency band. Frequencies that are closer together (for example between 1-100 ghz) may work better for electromagnetic sensing by sensors 8 due to the stronger relationship between waves that are closer together. Depending on the use, it may be better to use a different frequency for the sending and receiving of radar, than the frequency band used for web 10.

Figure 1:
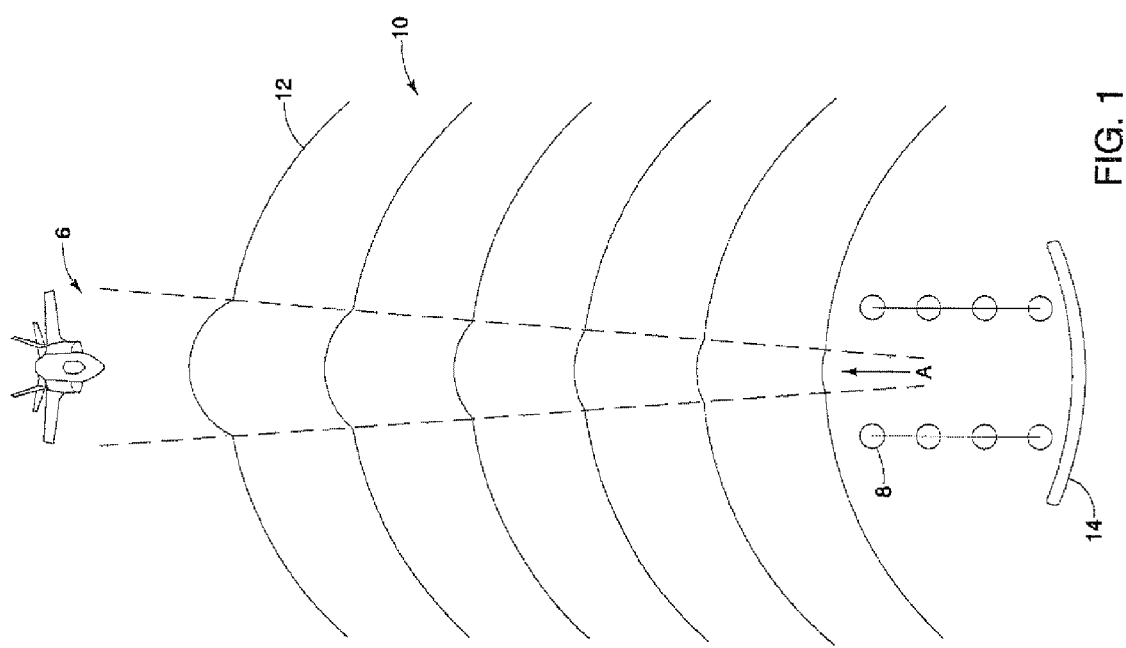
FIG. 1 is a diagrammatic view of an electromagnetic web containing a series of electromagnetic waves being influenced by the presence of a stealth object, and showing sensors to detect the resulting effects on the waves in the web.
Figure 2:
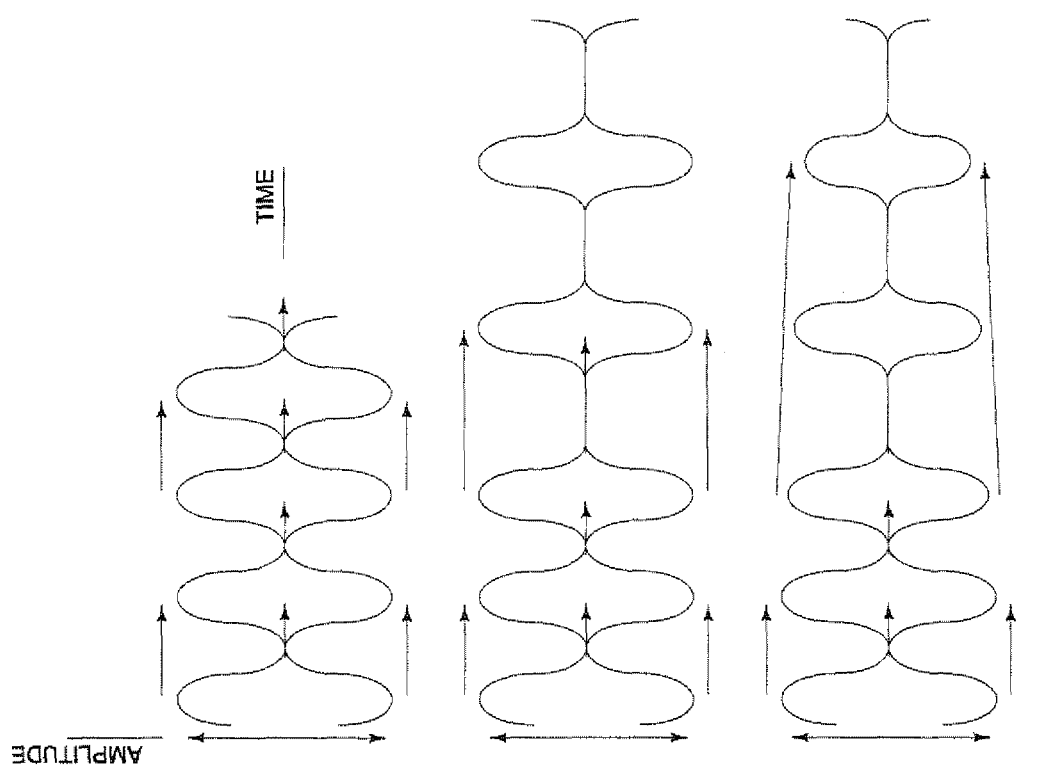
FIG. 2 is a series of three graphs showing in the top graph a representation of a series of waves unaffected by a stealth object, and showing in the middle and bottom graphs representations of how a stealth object may affect the wave frequency and amplitude respectively.

Once the frequency band has been established, the amplitude of waves 12 at each sensor 8 is determined. This may be done by recording the time it takes to charge a capacitor (not shown) or semi-conductor/chips in sensor 8. The more rapidly the electromagnetic wave charges the capacitors, etc, the greater the power level/amplitude of the wave. Wave amplitude is shown on the vertical axis the graph of FIG. 2. Another way to determine wave amplitude is to use a filter-type device. Once the amplitude of each wave 12 is known, and depending on the available processing power sample rate, the cycles either from zero to peak amplitude of the wave 12 or from peak to peak of waves 12 (or wave to wave if sample rate is low) are clocked.

The clock times sensed by sensor 8 are compared to find the common clock time. That time is the harmonic. By knowing the distance between each sensor 8 and the time it takes for each peak of a wave 12 to pass each sensor 8, the environment in which waves 12 are travelling may be understood. By adding the distance multiplied by the run time, the reach of web 10 is known. If the harmonic or amplitude changes in the web, then something has changed in the environment affecting the harmonic signature or wave amplitude. To find the location of that change, the difference between each probe is triangulated. The change is the detection of the stealth object.

Figure 3:
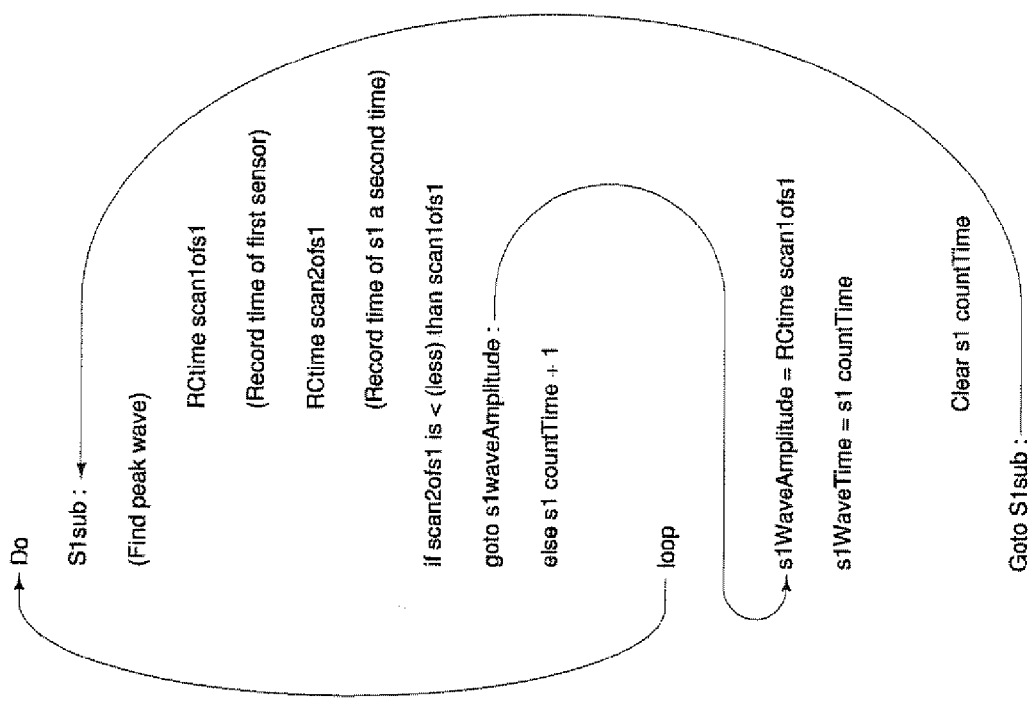
FIG. 3 is an example of coding steps in a routine for a processor to locate the peak of an electromagnetic wave and to determine amplitude of the wave.

FIG. 3 is an example of a routine to find wave amplitude and peak-to-peak time of sensor 8 (labelled s1) in the arrays of sensor 8. The routine may be done as part of a system coded in a processor or may be hardwired. As would be known one skilled in the art, there are many ways in which this routine may be varied and still work.

Figure 4:
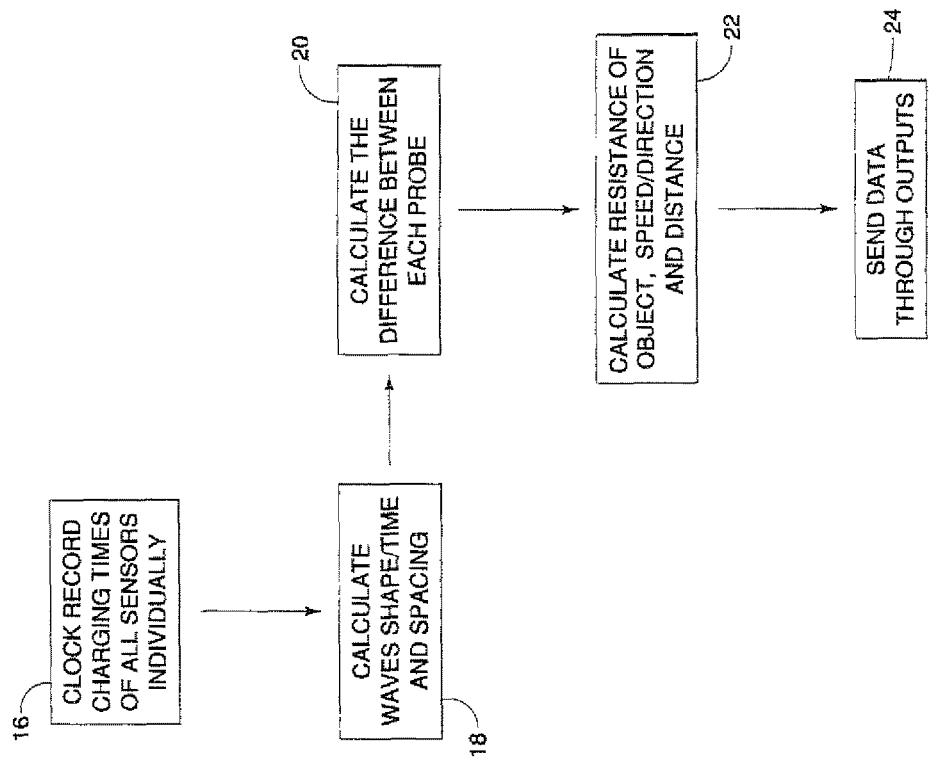
FIG. 4 is a logic flow chart for detecting and tracking a stealth object.

FIG. 4 lists the logic flow in the example described above. Thus in block 16 the charging time of each sensor 8 is recorded. In block 18 the shape/time and spacing of waves 12 is determined. In block 20 the difference between the values determined in block 18 for each sensor 8 is calculated. In block 22 the resistance, speed, direction and distance of the stealth object 6 is calculated. In block 24 the resulting data is output so that action as necessary may be taken as a result of detection, locating and tracking of the stealth object.

As will be apparent to those skilled in the art in the light foregoing disclosure, many alterations and modifications are possible in the practice of this invention without departing from the spirit or scope thereof. Accordingly, the scope of the invention is to be construed in accordance with the substance defined by the following claims.

What is claimed is:

1. A quantum harmonic radar method comprising:
   a) providing a transmitter for transmitting electromagnetic hertzian waves across a transmission field,
   b) providing a plurality of electromagnetic sensors in a sensor array positioned in said transmission field and spaced from said transmitter, wherein each sensor of said plurality of electromagnetic sensors is adapted to detect characteristics of said transmitted hertzian waves,
   c) providing a processor cooperating with said sensor array, wherein said processor is adapted to determine at least one of wave timing or wave spacing of said transmitted hertzian waves which are detected by said sensor array based on said detected characteristics,
   d) transmitting said hertzian waves having a predetermined amplitude and frequency from said transmitter across said transmission field and across said sensor array,
   e) detecting said characteristics of said transmitted hertzian waves by said sensor array and determining said timing or said spacing of said hertzian waves in said processor,
   f) comparing said determined timing or spacing of said detected hertzian waves with said pre-determined amplitude and frequency of said hertzian waves being transmitted from said transmitter, and by said comparison determining if said detected hertzian waves have a spacing therebetween which differs from a spacing between said transmitted hertzian waves having said pre-determined amplitude and frequency, whereupon signaling a presence in said transmission field of an electromagnetic energy absorbent object.

2. The method of claim 1 wherein said sensor array includes at least two spaced apart sensor probes and wherein said determining of said timing or spacing of said hertzian waves further includes triangulation of a position of said energy absorbent object by a comparison of said timing or spacing as detected by, and determined from, said hertzian waves detected by said at least two spaced apart sensor probes.

3. The method of claim 2 wherein said transmission of said hertzian waves from said transmitter is in a first direction, and wherein each probe of said at least two spaced apart sensor probes is elongated and contains a plurality of electromagnetic sensors therealong.

4. The method of claim 3 wherein said probes are elongated in a direction substantially in said first direction.

5. The method of claim 3 wherein said at least two spaced apart sensors probes are a substantially parallel pair of elongated sensor probes.

6. The method of claim 5 wherein said each sensor probe includes at least two said sensors mounted therealong.

7. The method of claim 1 wherein said each sensor detects said hertzian waves by charging, and clocks said waves by a charging time of each said sensors.

8. The method of claim 7 wherein said processor receives clocking information from said sensor and determines shape, timing or spacing information of said detected hertzian waves for said each sensor.

9. The method of claim 8 wherein said processor determines differences between said information for said each sensor so as to postulate existence of a detected energy absorbing object in said field.

10. The method of claim 9 wherein said processor determines attributes of said energy absorbing object from the group of attributes comprising: distance, direction, velocity, resistance.

11. The method of claim 1 wherein said sensor array includes a high resolution sensor grid.

12. The method of claim 11 wherein said sensor array includes a plurality of said sensor grids stacked one on top of another.

* * * * *